(12) United States Patent
Mantri

(10) Patent No.: US 10,079,656 B2
(45) Date of Patent: Sep. 18, 2018

(54) EXTENDED ACKNOWLEDGEMENT MECHANISM FOR COMMUNICATIONS BETWEEN A SOURCE NODE AND A DESTINATION NODE

(71) Applicant: Metanoia Communications Inc., Hsinchu (TW)

(72) Inventor: Ravi Mantri, Portland, OR (US)

(73) Assignee: METANOIA COMMUNICATIONS INC., Hsinchu (TW)

( * ) Notice: Subject to any disclaimer, the term of this patent is extended or adjusted under 35 U.S.C. 154(b) by 199 days.

(21) Appl. No.: 14/072,757

(22) Filed: Nov. 5, 2013

(65) Prior Publication Data

US 2014/0126555 A1    May 8, 2014

Related U.S. Application Data

(60) Provisional application No. 61/722,749, filed on Nov. 5, 2012.

(51) Int. Cl.
*H04L 1/16* (2006.01)
*H04L 1/18* (2006.01)

(52) U.S. Cl.
CPC .......... *H04L 1/1664* (2013.01); *H04L 1/1685* (2013.01); *H04L 1/1854* (2013.01)

(58) Field of Classification Search
None
See application file for complete search history.

(56) References Cited

U.S. PATENT DOCUMENTS

2004/0203705 A1* 10/2004 Lundby ................ H04L 1/0009
455/422.1

2012/0026908 A1* 2/2012 Tzannes .................. H04L 41/12
370/252

FOREIGN PATENT DOCUMENTS

WO    WO2011/136579    * 11/2011

OTHER PUBLICATIONS

ITU-Telecommunication Standardization Sector Temporary Document 09XC-119 (G.hn: Extended PHY frame header, Jul. 27-31, 2009).*

(Continued)

*Primary Examiner* — Christine Duong
(74) *Attorney, Agent, or Firm* — Han IP Corporation; Andy M. Han

(57) ABSTRACT

An extended acknowledgement mechanism is provided. In one aspect, a source node provides an indication that extended acknowledgement is supported. In response, the source node receives from a destination node an acknowledgement that comprises a regular acknowledgement frame, an extended acknowledgement frame, a bidirectional acknowledgement frame including payload data or an extended bidirectional acknowledgement frame that includes payload data. In another aspect, an indication is received from a source node a frame that extended acknowledgement is supported. In response, a destination node transmits to the source node an acknowledgement that comprises a regular acknowledgement frame, an extended acknowledgement frame, a bidirectional acknowledgement frame including payload data or an extended bidirectional acknowledgement frame that includes payload data. The ability of nodes supporting extended acknowledgement may be indicated during registration, and propagated throughout the network domain, so as to avoid per-frame indication in subsequent communications.

55 Claims, 4 Drawing Sheets

(56) References Cited

OTHER PUBLICATIONS

ITU-Telecommunication Standardization Sector of ITU G.9960 (Series G: transmission systems and media, digital systems and networks, access networks—in premises networks; Unified high-speed wire-line based home networking transceivers—System architecture and physical layer specification; Recommendation ITU-T G.9960; Jun. 2010).*

* cited by examiner

EXTENDED ACKNOWLEDGEMENT MECHANISM FOR COMMUNICATIONS BETWEEN A SOURCE NODE AND A DESTINATION NODE

CROSS REFERENCE TO RELATED PATENT APPLICATION

This application is a non-provisional application claiming the priority benefit of U.S. Patent Application No. 61/722,749, filed on 5 Nov. 2012 and entitled "Extended Acknowledgement Mechanism For Communications Between A Source Node And A Destination Node", which is incorporated by reference in its entirety.

BACKGROUND

Technical Field

The present disclosure relates to the field of digital communication and, more specifically, to acknowledgement transmitted between two nodes in communication.

Description of Related Art

Modern communication systems designed for operation on power line and other mediums, which tend to suffer from dynamically changing channel and noise conditions, include retransmission mechanisms at the physical layer to improve the throughput for the user. One such communication standard is the ITU-T G.hn family of standards.

The ITU-T G.hn family of standards (G.9960, G.9961 and G.9963, for example, at: http://www.itu.int/ITU-T/recommendations/index.aspx?ser=G) includes an acknowledgement mechanism whereby a source node can request a destination node to send an immediate acknowledgement after the destination node completes receiving the frame transmitted by the source node. The acknowledgement consists of a limited number of bits which can be used to communicate the status of the received data units to the transmitter, the source node, in order for the transmitter to retransmit the data units that are indicated by the receiver as received with error. The mechanism also allows several compression schemes in order to ensure that the limited number of bits available in the acknowledgement frame are sufficient to communicate the status of the received data units in most practical cases. In some cases the compression results in unnecessary retransmission of data units that have been received correctly by the destination node for which the status could not be communicated due to lack of sufficient number of bits in the acknowledgement frame.

However, the new G.9963 standard (multiple-input-multiple-output, or MIMO, version of G.hn) significantly exacerbates the issue of limited number of bits in the acknowledgement frame because the data transmission capability is approximately doubled under the G.9963 standard compared to single-input-single-output, or SISO (G.9960/G.9961), and may result in a lot of unnecessary retransmissions that would reduce the overall data transmission efficiency as well as increase the time on wire and power consumption. The maximum allowed transmission window size for the acknowledgement mechanism was also increased for both G.9961 and G.9963 standards to address the requirements of high throughput links. This further exacerbates the issue of limited number of bits in the acknowledgement frame.

SUMMARY

Various embodiments pertaining to techniques, processes, algorithms and devices related to an extended acknowledgement mechanism are described herein. The techniques or algorithms may be implemented in software, firmware, hardware, or any combination thereof.

According to one aspect, a method may comprise: providing, by a source node, an indication that extended acknowledgement is supported by the source node; and receiving, from a destination node by the source node, an acknowledgement that comprises a regular acknowledgement frame, an acknowledgement that comprises an extended acknowledgement frame, a bidirectional acknowledgement (BACK) frame that includes data, or an extended BACK frame that includes data.

In at least some embodiments, the providing may include transmitting the indication in a frame.

In at least some embodiments, the providing may include communicating with a domain master to provide the indication during registration with the domain master such that the indication is propagated domain-wide via media access plan (MAP) or routing update.

In at least some embodiments, the extended acknowledgement frame may comprise an extended PHY frame header.

In at least some embodiments, the frame may be a bidirectional message (BMSG) frame. Alternatively, the frame may be a MSG frame as defined in G.9960/G.9961.

In at least some embodiments, the frame may request for immediate acknowledgement, and the acknowledgement may comprise an acknowledgement (ACK) frame having an EXTACKRQ field set to 1. This field means that the destination node would like to send extended ACKs and therefore if the source node supports extended ACK the source node should grant the request from the destination node.

In at least some embodiments, a bidirectional frame sequence between the source node and the destination node including at least the message and the acknowledgement may occur within boundaries of a predefined transmit opportunity (TXOP) or time slot (TS) for the source node.

In at least some embodiments, the bidirectional frame sequence between the source node and the destination node may occur during a contention-free transmit opportunity (CFTXOP), a shared transmit opportunity (STXOP), or a contention-based transmit opportunity (CBTXOP).

In at least some embodiments, the acknowledgement may be an immediate acknowledgement.

In at least some embodiments, the frame may include a BTXGL field set to a non-zero value, a BTXEF field set to 1, and an EXTACKGR field set to 1. This is a way in which a source node indicates that the destination node is allowed to send an extended acknowledgement.

In at least some embodiments, the frame may include an EXTACKSUP field set to 1. This indicates to the destination node that the source node supports the extended acknowledgement mechanism as described herein.

In at least some embodiments, the frame may indicate a maximum duration of a BACK frame.

In at least some embodiments, the regular acknowledgement frame, the extended acknowledgement frame, or the BACK frame may be received from the destination node before another frame is received from the destination node.

In at least some embodiments, the method may further comprise: terminating the extended acknowledgement; and re-starting extended acknowledgement sometime after the terminating.

In at least some embodiments, the method may further comprise: receiving, from the destination node, a BACK frame indicating the extended acknowledgement may be terminated; and terminating the extended acknowledgement.

In at least some embodiments, the BACK frame indicating the extended acknowledgement may be terminated may include a BTXRL field set to 0 and an EXTACKRQ field set to 0.

In at least some embodiments, the method may further comprise: terminating a bidirectional transmission by transmitting a BMSG frame with a BTXEF field set to 1 and a BTXGL field set to a non-zero value such that a total duration of a bidirectional frame sequence between the source node and the destination node includes the non-zero value set in the BTXGL field.

According to another aspect, a method may comprise: receiving, from a source node, an indication that extended acknowledgement is supported; and transmitting, by a destination node in response to the receiving, an acknowledgement that comprises a regular acknowledgement frame, an extended acknowledgement frame, a bidirectional acknowledgement (BACK) frame that includes payload data, or an extended BACK frame that includes payload data. For a given implementation, a subset of these choices may be used and is within the scope of the present disclosure. If extended acknowledgement is not supported by the destination node, the acknowledgement from the destination node would not include an extended acknowledgement frame or an extended BACK frame.

In at least some embodiments, the receiving may include receiving the indication in a frame from the source node.

In at least some embodiments, the receiving may include receiving the indication via media access plan (MAP) or routing update from a domain master, after registration of the source node with a domain master with the indication provided by the source node to the domain master during registration, such that the indication is propagated domain-wide via MAP or routing update.

In at least some embodiments, the extended acknowledgement frame may comprise an extended PHY frame header.

In at least some embodiments, the frame may be a bidirectional message (BMSG) frame. Alternatively, the frame may be a MSG frame as defined in G.9960/G.9961.

In at least some embodiments, the frame may request for immediate acknowledgement, and the acknowledgement may comprise an acknowledgement (ACK) frame having an EXTACKRQ field set to 1. This field means that the destination node would like to send extended ACKs and therefore if the source node supports extended ACK the source node should grant the request from the destination node.

In at least some embodiments, a bidirectional frame sequence between the source node and the destination node including at least the message and the acknowledgement may occur within boundaries of a predefined transmit opportunity (TXOP) or time slot (TS) for the source node.

In at least some embodiments, the bidirectional frame sequence between the source node and the destination node may occur during a contention-free transmit opportunity (CFTXOP), a shared transmit opportunity (STXOP), or a contention-based transmit opportunity (CBTXOP).

In at least some embodiments, the acknowledgement may be an immediate acknowledgement.

In at least some embodiments, the frame may include a BTXGL field set to a non-zero value, a BTXEF field set to 1, and an EXTACKGR field set to 1. This is a way in which a source node indicates that the destination node is allowed to send an extended acknowledgement.

In at least some embodiments, the frame may include an EXTACKSUP field set to 1. This indicates to the destination node that the source node supports the extended acknowledgement mechanism as described herein.

In at least some embodiments, the frame may indicate a maximum duration of a BACK frame.

In at least some embodiments, the regular acknowledgement frame, the extended acknowledgement frame, or the BACK frame may be transmitted by the destination node before another frame is transmitted by the destination node.

In at least some embodiments, the method may further comprise: transmitting, from the destination node to the source node, a BACK frame indicating the extended acknowledgement may be terminated.

In at least some embodiments, the BACK frame indicating the extended acknowledgement may be terminated may include a BTXRL field set to 0 and an EXTACKRQ field set to 0.

In at least some embodiments, the method may further comprise: transmitting, from the destination node to the source node, a BACK frame indicating a desired duration for a subsequent BACK frame.

In at least some embodiments, the BACK frame indicating the desired duration for a subsequent BACK frame may include a BTXRL field in a PHY frame header that includes the desired duration.

According to one aspect, a method may comprise: receiving, from a first network node during registration of the first network node with a domain master of a network domain, information indicating a capability of the first network node regarding whether extended acknowledgement is supported by the first network node; and propagating the information to one or more network nodes associated with the network domain.

In at least some embodiments, the propagating may include propagating via media access plan (MAP) or routing update.

In at least some embodiments, the extended acknowledgement may be supported by at least one of the one or more network nodes.

In at least some embodiments, the extended acknowledgement may be supported by at least a second network node of the one or more network nodes and not supported by at least a third network node of the one or more network nodes.

In at least some embodiments, the second network node and the third network node may be assigned to a predefined transmit opportunity (TXOP).

In at least some embodiments, the method may further comprise receiving one or more frames from the first network node, each of the one or more frames containing no indication of the capability of the first network node regarding whether the extended acknowledgement is supported by the first network node.

In at least some embodiments, the method may further comprise, in response to the first network node supporting the extended acknowledgement and receiving the one or more frames from the first network node, transmitting an acknowledgement that comprises a regular acknowledgement frame, an acknowledgement that comprises an extended acknowledgement frame, a bidirectional acknowledgement (BACK) frame that includes data, or an extended BACK frame that includes data.

According to another aspect, a method may comprise: providing, by a first network node during registration of the first network node with a domain master of a network domain, information indicating a capability of the first network node regarding whether extended acknowledgement is supported by the first network node; and transmitting, by the first network node, one or more frames to one or more network nodes associated with the network domain, each of the one or more frames containing no indication of the capability of the first network node regarding whether the extended acknowledgement is supported by the first network node.

In at least some embodiments, the information may be propagated to the one or more network nodes via media access plan (MAP) or routing update.

In at least some embodiments, the extended acknowledgement may be supported by at least one of the one or more network nodes.

In at least some embodiments, the extended acknowledgement may be supported by at least a second network node of the one or more network nodes and not supported by at least a third network node of the one or more network nodes.

In at least some embodiments, the second network node and the third network node may be assigned to a predefined transmit opportunity (TXOP).

In at least some embodiments, the method may further comprise receiving, from at least one of the one or more network nodes, an acknowledgement that comprises a regular acknowledgement frame, an acknowledgement that comprises an extended acknowledgement frame, a bidirectional acknowledgement (BACK) frame that includes data, or an extended BACK frame that includes data.

This summary is provided to introduce concepts relating to techniques related to the proposed extended acknowledgement mechanism. Some embodiments of the techniques are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
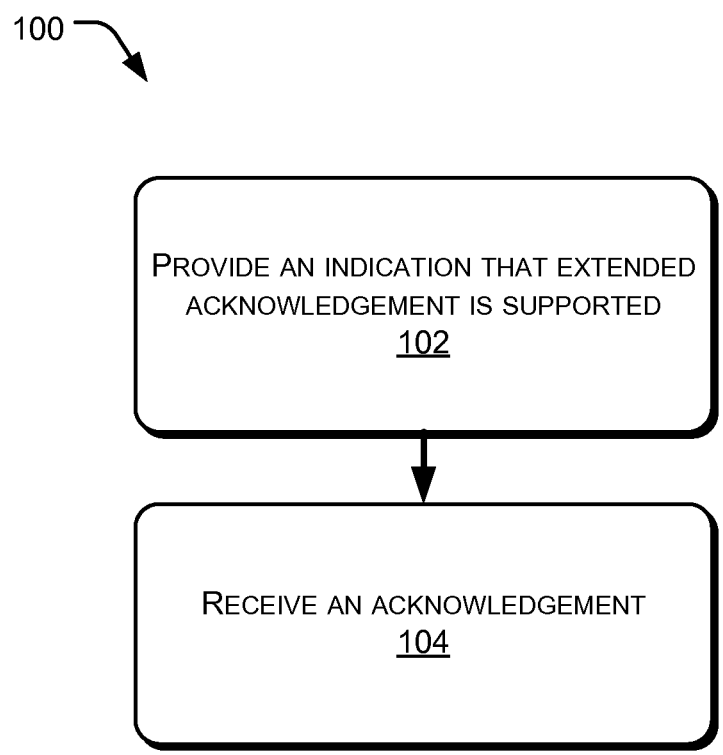
FIG. 1 is a flowchart of one aspect of extended acknowledgement in accordance with an embodiment of the present disclosure.

Various embodiments of the present disclosure pertain to an extended acknowledgement mechanism that increases the capacity of the acknowledgement frames without impacting the backward compatibility with legacy devices. As the proposed extended acknowledgement mechanism is applicable in cases where the current acknowledgement mechanism is not adequate, the legacy mechanism or the proposed extended acknowledgement mechanism may be used depending on the specific requirements. More specifically, the proposed extended acknowledgement mechanism may be used whenever the legacy mechanism is not sufficient to meet the requirement of reducing unnecessary retransmissions of data that have been correctly received by the destination node.

The proposed extended acknowledgement mechanism is believed to satisfy a number of requirements.

Firstly, the mechanism allows the usage of a two or more symbol acknowledgement frame, in addition to the single symbol acknowledgement frame allowed in legacy G.hn nodes. In the description below, although examples used in describing the mechanism uses two-symbol acknowledgement frame for simplicity, one of ordinary skill in the art would appreciate that the mechanism can be extended to use additional symbols in the acknowledgement frame.

Secondly, the acknowledging node (e.g., the destination node) is able to indicate to the transmitting node (e.g., the source node) that the acknowledging node would benefit from an acknowledgement extension, and therefore the transmitting node should grant it an opportunity to transmit extended acknowledgement with two or more symbols and/or optional additional payload symbols.

Thirdly, the source node is able to selectively choose whether the acknowledging node is only allowed to use a regular acknowledgement (single symbol) or may be allowed to use an extended acknowledgement (two or more symbols). One benefit of this mechanism is to ensure that an acknowledging node can still work with a legacy source node that is not aware of extended acknowledgement mechanism.

Fourthly, the source node's request to the acknowledging node (i.e., destination node) to use extended acknowledgement is not mandatory for the acknowledging node to honor. This ensures that the scheme works with both kinds of acknowledging nodes, those that support the extended acknowledgement and those that are legacy nodes that do not support the extended acknowledgement.

Fifthly, the mechanism does not require dedicating new PHY frame types, so that PHY frame types can be reserved for other purposes in future. The proposed mechanism uses existing PHY frame types as defined in G.9960 and G.9961 standards. A PHY frame is a frame at the physical layer as well as a unit of transmission that starts with a preamble, which includes a header and in some cases payload. Different PHY frames are defined in G.9960 for different purposes (e.g., see Table 7-1 in G.9960).

Sixthly, the use of extended acknowledgement during a shared transmit opportunity (STXOP) or contention based transmit opportunity (CBTXOP) does not impact the ability of passive legacy nodes that may not support extended acknowledgement or have knowledge of extended acknowledgement mechanism to track the grid of time slots (TSs) after a collision or if the first frame transmission from the source node (the one corresponding to the acknowledgement) is missed by those passive nodes.

Seventhly, a bidirectional acknowledgement (BACK) frame as currently defined in G.9960/G.9961 only contains a single symbol for acknowledgement information followed by one or more symbols of payload data. However, in the various embodiments of the present disclosure this can easily be extended to support extended BACK that contains an extended acknowledgement with two or more symbols followed by one or more symbols of payload data.

Moreover, the proposed mechanism does not require specific knowledge of whether the transmitting and/or receiving node is a legacy node or the node supporting this mechanism. However, if the capability of the node is informed in advance (e.g., at registration and propagating this information domain wide, via the media access plan or MAP or via a routing update), whether it is a legacy node or a node that supports the proposed mechanism of the present disclosure, then there is no need to indicate such capability on a per PHY frame basis.

Furthermore, the proposed scheme is designed to work in a domain where some of the nodes may be legacy nodes, while other nodes in the domain may support the extended ACK mechanism of the present disclosure, and all the nodes are assigned to the same shared TXOP and therefore are required to successfully track the grid. In other words, the proposed scheme does not impair the ability of legacy nodes to track the grid of time slots within a shared TXOP even if some of the nodes that support the extended ACK mechanism transmit and receive extended ACKs within the TXOP, although the extended ACK mechanism is not supported by legacy nodes.

Example Implementations

Key features of the extended acknowledgement mechanism in accordance with the present disclosure are described below.

The bidirectional message (BMSG) or message (MSG) frame may be used by a source node to indicate to the destination node that the source node supports reception of an extended acknowledgement. In response, the destination node that supports an extended acknowledgement may choose one of the following options on a per-frame basis depending on the specific requirement and the time granted by the source node: (1) send a regular acknowledgement using an ACK frame; (2) send an extended acknowledgement using an extended ACK frame; and (3) in response to a BMSG frame, send a BACK frame, or an extended BACK frame, that contains one or more payload symbols, in addition to the acknowledgement symbol(s), if the destination node has additional data to transmit.

The extended acknowledgement (ACK) frames may be in a format in which the PHY frame header contains 2×$PHY_H$ information bits (extended header information (EHI) bit in the PHY frame header is set to one, see clause 7.1.2.3.1.7 of [ITU-T G.9960]).

An exchange of BMSG and BACK/ACK/extended ACK/extended BACK frames may form a bidirectional frame sequence that lasts strictly inside the boundaries of the particular TXOP or TS assigned in the media access plan (MAP) for the node sourcing the bidirectional transmission. The MAP contains TXOP assignments and schedule that is generated and sent by the domain master in a G.hn domain to all associated nodes.

An extended acknowledgement may be initiated by either a source node or a destination node using one of several methods. A destination node may transmit to the source node, in response to a MSG frame requesting immediate acknowledgement, an ACK frame with the extended acknowledgement request (EXTACKRQ) field set to one. For legacy receiving nodes, EXTACKRQ is always set to zero, since a formerly reserved bit is used for the EXTACKRQ field by the new devices (Note that the reserved bits in G.9960/G.9961/G.9963 specifications are generally required to be set to zero). Alternatively, a source node may transmit to the destination node a BMSG frame with the bidirectional transmission grant length (BTXGL) field set to a non-zero value, bidirectional transmission end flag (BTXEF) field set to one and extended acknowledgement request granted (EXTACKGR) field set to one. By setting the EXTACKGR field to one, the transmitting node indicates to the acknowledging node that its request for extended acknowledgement is granted. By setting appropriate value in the field BTXGL, the source node can allocate time for the destination node to send acknowledgement and/or payload data. Also, it indicates that the transmitting node is capable of receiving extended acknowledgement. For legacy nodes, EXTACKGR is set to zero. Still alternatively, a source node may transmit to the destination node a MSG frame with extended acknowledgement supported (EXTACKSUP) field set to one. The EXTACKSUP field indicates that the transmitting node is capable of receiving extended acknowledgement. For legacy transmitting nodes, EXTACKSUP is set to zero.

If a source node requested by a destination node to initiate extended acknowledgements accepts the request, the source node may indicate that the request is granted and initiates bidirectional transmission by transmitting a BMSG frame that initiates extended acknowledgements. Alternatively, the source node requested to initiate extended acknowledgement may decline the request. In one embodiment, the source node may indicate that the extended acknowledgement request is declined by continuing to send MSG frames to the requesting node with EXTACKSUP field set to zero or BMSG frames with the EXTACKGR set to zero, instead of the BMSG frame that initiates extended acknowledgements. The legacy transmitting nodes would behave the same as the node that declines the extended acknowledgement request, therefore ensuring interoperability of acknowledging nodes supporting extended acknowledgements with legacy transmitting nodes.

A source node may initiate extended acknowledgements autonomously, without a request from the destination node. The source node may terminate extended acknowledgements at any time and re-start extended acknowledgements again. A destination node may indicate to the source node when the extended acknowledgements may be stopped by setting the EXTACKRQ to zero, while the decision is up to the source node. In a legacy destination node the field EXTACKRQ is always set to zero, since a formerly reserved bit is used for the EXTACKRQ field by the new devices, thereby ensuring that there is no adverse effect from this extended acknowledgement mechanism that it does not support.

A destination node may respond to the BMSG frame that initiates extended acknowledgements by one of several ways. The destination node may transmit a BACK frame that contains payload data intended for the source node. The BACK frame may additionally contain acknowledgement information for data previously transmitted by the source node. This option can be used if extended acknowledgement is not needed. Alternatively, the destination node may transmit an ACK frame. Still alternatively, the destination node may transmit an extended ACK frame, if it supports extended acknowledgement mechanism. Still alternatively, the destination node may transmit an extended BACK frame (if it supports extended acknowledgement mechanism) that contains payload data intended for the source node, in addition to two or more symbols of acknowledgement information for data previously transmitted by the source node.

The destination node may indicate that extended acknowledgement is not needed any further (advice for termination of extended acknowledgement) by setting the bidirectional transmission request length (BTXRL)=0 and EXTACKRQ=0 in the BACK frame. In response, the source node may optionally terminate extended acknowledgement. The BTXRL field contains the requested bidirectional transmission duration in multiples of 8 microseconds (µs) and is represented as an 8-bit unsigned integer. A request length value of zero indicates that the acknowledging node is not requesting bidirectional transmission.

The source node may determine the maximum duration of a ACK/BACK frame based on the BTXGL field of the PHY-frame header. The destination node may indicate the desired duration of ACK/BACK frame in the BTXRL field of the PHY-frame header of the previous BACK frame, but the final decision on the ACK/BACK frame duration limit (including the following inter frame gap, or IFG) may be determined by the source node.

A responding BACK frame may be transmitted after a duration of a default inter frame gap after the BMSG frame, or $T_{BM2BAIFG}$, after the BMSG frame. The immediate acknowledgement frame (regular ACK or extended ACK) may be transmitted after a duration of a default inter frame gap after the BMSG frame, or $T_{AIFG}$, after the BMSG frame. In the frame sequences, BMSG may be followed by a BACK or BMSG may be followed by an immediate acknowledgement (regular or extended). If the transmitter of the first frame has no knowledge of the 'receiver specific' AIFG or if the first frame in any of the above frame sequences includes less than a minimum number of symbols following the header required in a frame to use receiver-specific $T_{AIFG}$, or MIN_SYM_VAR_AIFG, symbols, the gap between this frame and the following frame may be $T_{AIFG-D}$; otherwise the gap may be $T_{AIFG}$. The parameter MIN_SYM_VAR_AIFG is defined in ITU-T G.9961 for each medium. The transmitter may indicate usage of either $T_{AIFG}$ or $T_{AIFG-D}$ by using the AIFG_IND field in the PHY-frame header (see clause 7.1.2.3.2.2.16 of [ITU-T G.9960]), where AIFG-D is a default value of AIFG.

Extended acknowledgement may be used in CFTXOP, STXOP, and CBTXOP. The source node may ensure that the total duration of the bidirectional frame sequence does not violate the boundaries of the TXOP or the maximum allowed duration of the TS. In one embodiment, if extended acknowledgement is used in a CFTXOP, the last frame in the sequence may end at least $T_{IFG\_MIN}$ before the end of the CFTXOP. In another embodiment, if extended acknowledgement is used in a CFTS or in a CBTS, the last frame in the sequence may end at least $T_{IFG\_MIN}$ before the end of the Max_TS_Length assigned in the MAP for the TS and at least $T_{IFG\_MIN}$ before the end of the TXOP where this TS is defined.

When the bidirectional transmission is terminated with a BMSG frame with BTXEF=1 and BTXGL≠0, the total duration of the frame sequence (generally used for tracking the grid of TSs in the TXOP by nodes assigned to the TXOP) may include this BTXGL value, regardless of the actual duration of the last BACK/extended BACK frame, acknowledgement frame or extended acknowledgement frame.

Nodes detecting a bidirectional transmission may stay silent until the end of the bidirectional transmission sequence or until the expiration of the Max_TS_Length of the corresponding TS, whichever comes first.

Example Processes

FIG. 1 illustrates a process 100 of one aspect of extended acknowledgement in accordance with an embodiment of the present disclosure.

Example process 100 includes one or more operations, actions, or functions as illustrated by one or more of blocks 102 and 104. Although illustrated as discrete blocks, various blocks may be divided into additional blocks, combined into fewer blocks, or eliminated, depending on the desired implementation. Further, process 100 may be implemented by software, hardware, or a combination of software and hardware in a communication device. For illustrative purposes, the operations described below are performed by a processor or integrated circuit of a communication device. Processing may begin at block 102.

At 102, an indication that extended acknowledgement is supported may be provided, e.g., by a source node.

At 104, an acknowledgement that comprises a regular acknowledgement frame, an acknowledgement that comprises an extended acknowledgement frame, a bidirectional acknowledgement (BACK) frame that includes payload data, or an extended BACK frame that includes payload data may be received, e.g., from a destination node by the source node.

In at least some embodiments, the providing may include transmitting the indication in a frame. The frame may be, for example, a message frame.

In at least some embodiments, the providing may include communicating with a domain master to provide the indication during registration with the domain master such that the indication is propagated domain-wide via media access plan (MAP) or routing update.

In at least some embodiments, the extended acknowledgement frame may comprise an extended PHY frame header. For example, the extended acknowledgement frames may use a format in which the PHY frame header contains $2 \times PHY_H$ information bits (EHI bit in the PHY frame header is set to one, see clause 7.1.2.3.1.7 of [ITU-T G.9960]).

In at least some embodiments, the frame may be a bidirectional message (BMSG) frame. Alternatively, the frame may be an MSG frame as defined in G.9960/G.9961.

In at least some embodiments, the frame may request for immediate acknowledgement, and the acknowledgement may comprise an acknowledgement (ACK) frame having an EXTACKRQ field set to 1. This field means that the destination node would like to send extended ACKs and therefore if the source node supports extended ACK the source node should grant the request from the destination node.

In at least some embodiments, a bidirectional frame sequence between the source node and the destination node including at least the message and the acknowledgement may occur within boundaries of a predefined transmit opportunity (TXOP) or time slot (TS) for the source node, e.g., assigned in the MAP for the node sourcing the bidirectional transmission.

In at least some embodiments, the bidirectional frame sequence between the source node and the destination node may occur during a contention-free transmit opportunity (CFTXOP), a shared transmit opportunity (STXOP), or a contention-based transmit opportunity (CBTXOP). For example, the source node may ensure that the total duration of the bidirectional frame sequence does not violate the boundaries of the TXOP or the maximum allowed duration of the TS.

In at least some embodiments, the acknowledgement may be an immediate acknowledgement.

In at least some embodiments, the frame may include an indication by the source node that the destination node is allowed to send an extended acknowledgement. For example, the indication that the destination node is allowed to send an extended acknowledgement may include a BTXGL field set to a non-zero value, a BTXEF field set to 1, and an EXTACKGR field set to 1.

In at least some embodiments, the frame may include an indication to the destination node that the source node supports the extended acknowledgement. For example, the indication to the destination node that the source node supports the extended acknowledgement may include an EXTACKSUP field set to 1.

In at least some embodiments, the frame may indicate a maximum duration of a BACK frame.

In at least some embodiments, the regular acknowledgement frame, the extended acknowledgement frame, the BACK frame or the extended BACK frame may be received from the destination node before another frame is received from the destination node. For example, the regular acknowledgement frame, the extended acknowledgement frame, or the BACK (regular or extended) frame may be an immediate acknowledge frame that follows the BMSG frame.

In at least some embodiments, the process 100 may further comprise: terminating the extended acknowledgement; and re-starting extended acknowledgement sometime after the terminating. For example, the source node may terminate the extended acknowledgement at any time as well as re-start the extended acknowledgement.

In at least some embodiments, the process 100 may further comprise: receiving, from the destination node, a BACK frame indicating the extended acknowledgement may be terminated; and terminating the extended acknowledgement. For example, the source node may receive an indication from the destination node that extended acknowledgement is no longer required and then, in response, terminates the extended acknowledgement.

In at least some embodiments, the BACK frame indicating the extended acknowledgement may be terminated may include a BTXRL field set to 0 and an EXTACKRQ field set to 0.

In at least some embodiments, the process 100 may further comprise: terminating a bidirectional transmission by transmitting a BMSG frame with a BTXEF field set to 1 and a BTXGL field set to a non-zero value such that a total duration of a bidirectional frame sequence between the source node and the destination node includes the non-zero value set in the BTXGL field. For example, the source node may transmit such a BMSG frame to terminate the bidirectional transmission and the last frame sequence can include an extended acknowledgement.

Figure 2:
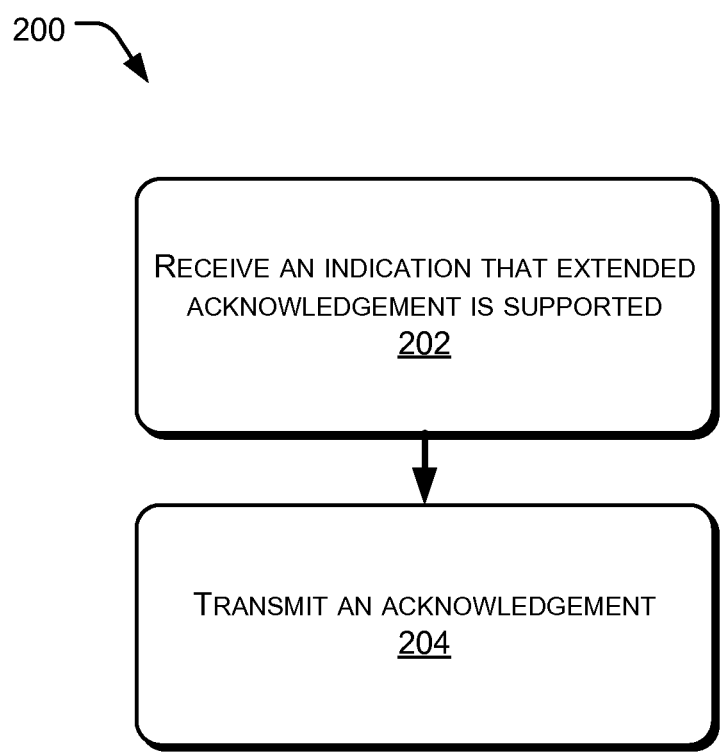
FIG. 2 is a flowchart of another aspect of extended acknowledgement in accordance with an embodiment of the present disclosure.

FIG. 2 illustrates a process 200 of another aspect of extended acknowledgement in accordance with an embodiment of the present disclosure.

Example process 200 includes one or more operations, actions, or functions as illustrated by one or more of blocks 202 and 204. Although illustrated as discrete blocks, various blocks may be divided into additional blocks, combined into fewer blocks, or eliminated, depending on the desired implementation. Further, process 200 may be implemented by software, hardware, or a combination of software and hardware in a communication device. For illustrative purposes, the operations described below are performed by a processor or integrated circuit of a communication device. Processing may begin at block 202.

At 202, an indication that extended acknowledgement is supported may be received, e.g., from a source node.

At 204, an acknowledgement that comprises a regular acknowledgement frame, an extended acknowledgement frame, a bidirectional acknowledgement (BACK) frame that includes payload data, or an extended BACK frame that includes payload data may be transmitted, e.g., by a destination node in response to receiving the frame.

For a given implementation, a subset of these choices may be used and is within the scope of the present disclosure. If extended acknowledgement is not supported by the destination node, the acknowledgement from the destination node would not include an extended acknowledgement frame or an extended BACK frame.

In at least some embodiments, the receiving may include receiving the indication in a frame from the source node. The frame may be, for example, a message frame.

In at least some embodiments, the receiving may include receiving the indication via media access plan (MAP) or routing update from a domain master, after registration of the source node with a domain master with the indication provided by the source node to the domain master during registration, such that the indication is propagated domain-wide via MAP or routing update.

In at least some embodiments, the extended acknowledgement frame may comprise an extended PHY frame header.

In at least some embodiments, the frame may be a bidirectional message (BMSG) frame. Alternatively, the frame may be an MSG frame as defined in G.9960/G.9961.

In at least some embodiments, the frame may request for immediate acknowledgement, and the acknowledgement may comprise an acknowledgement (ACK) frame having an EXTACKRQ field set to 1. This field means that the destination node would like to send extended ACKs and therefore if the source node supports extended ACK the source node should grant the request from the destination node.

In at least some embodiments, a bidirectional frame sequence between the source node and the destination node including at least the message and the acknowledgement may occur within boundaries of a predefined transmit opportunity (TXOP) or time slot (TS) for the source node, e.g., assigned in the MAP for the node sourcing the bidirectional transmission.

In at least some embodiments, the bidirectional frame sequence between the source node and the destination node may occur during a contention-free transmit opportunity (CFTXOP), a shared transmit opportunity (STXOP), or a contention-based transmit opportunity (CBTXOP). For example, the source node may ensure that the total duration of the bidirectional frame sequence does not violate the boundaries of the TXOP or the maximum allowed duration of the TS.

In at least some embodiments, the acknowledgement may be an immediate acknowledgement.

In at least some embodiments, the frame may include an indication by the source node that the destination node is allowed to send an extended acknowledgement. For example, the indication that the destination node is allowed to send an extended acknowledgement may include a BTXGL field set to a non-zero value, a BTXEF field set to 1, and an EXTACKGR field set to 1.

In at least some embodiments, the frame may include an indication to the destination node that the source node supports the extended acknowledgement. For example, the indication to the destination node that the source node supports the extended acknowledgement may include an EXTACKSUP field set to 1.

In at least some embodiments, the frame may indicate a maximum duration of a BACK frame.

In at least some embodiments, the regular acknowledgement frame, the extended acknowledgement frame, the BACK frame or the extended BACK frame may be transmitted by the destination node before another frame is transmitted by the destination node. For example, the regular acknowledgement frame, the extended acknowledgement frame, the BACK frame, or the extended BACK frame may be an immediate acknowledge frame that follows the BMSG frame.

In at least some embodiments, the process 200 may further comprise: transmitting, from the destination node to the source node, a BACK frame indicating the extended acknowledgement may be terminated. For example, upon determining that the extended acknowledgement is no longer required, the destination node may transmit a BACK frame to the source node to indicate that the extended acknowledgement may be terminated.

In at least some embodiments, the BACK frame indicating the extended acknowledgement may be terminated may include a BTXRL field set to 0 and an EXTACKRQ field set to 0.

In at least some embodiments, the process 200 may further comprise: transmitting, from the destination node to the source node, a BACK frame indicating a desired duration for a subsequent BACK frame. For example, the destination node may indicate a desired duration for subsequent BACK frame by indicating the desired duration in a BACK frame transmitted to the source node.

In at least some embodiments, the BACK frame indicating the desired duration for a subsequent BACK frame may include a BTXRL field in a PHY frame header that includes the desired duration.

Figure 3:
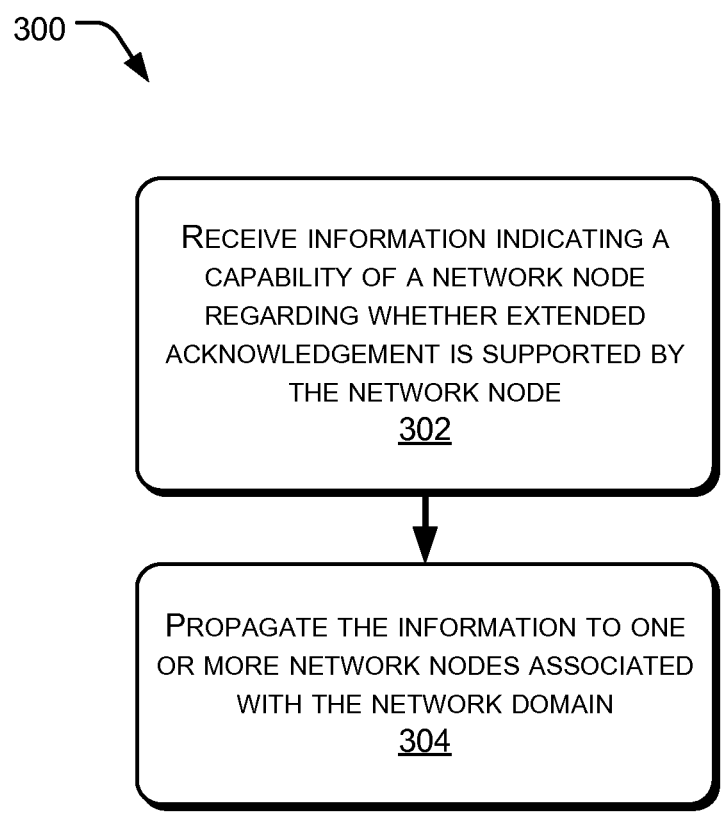
FIG. 3 is a flowchart of yet another aspect of extended acknowledgement in accordance with an embodiment of the present disclosure.

FIG. 3 illustrates a process 300 of yet another aspect of extended acknowledgement in accordance with an embodiment of the present disclosure.

Example process 300 includes one or more operations, actions, or functions as illustrated by one or more of blocks 302 and 304. Although illustrated as discrete blocks, various blocks may be divided into additional blocks, combined into fewer blocks, or eliminated, depending on the desired implementation. Further, process 300 may be implemented by software, hardware, or a combination of software and hardware in a communication device. For illustrative purposes, the operations described below are performed by a processor or integrated circuit of a communication device. Processing may begin at block 302.

At 302, information may be received, by a domain master of a network domain, from a first network node during registration of the first network node with the domain master of the network domain. The information may indicate a capability of the first network node regarding whether extended acknowledgement is supported by the first network node.

At 304, the information may be propagated, e.g., by the domain master, to one or more network nodes associated with the network domain.

In at least some embodiments, the propagating may include propagating via media access plan (MAP) or routing update.

In at least some embodiments, the extended acknowledgement may be supported by at least one of the one or more network nodes.

In at least some embodiments, the extended acknowledgement may be supported by at least a second network node of the one or more network nodes and not supported by at least a third network node of the one or more network nodes.

In at least some embodiments, the second network node and the third network node may be assigned to a predefined transmit opportunity (TXOP).

In at least some embodiments, the method may further comprise receiving one or more frames from the first network node, each of the one or more frames containing no indication of the capability of the first network node regarding whether the extended acknowledgement is supported by the first network node.

In at least some embodiments, the method may further comprise, in response to the first network node supporting the extended acknowledgement and receiving the one or more frames from the first network node, transmitting an acknowledgement that comprises a regular acknowledgement frame, an acknowledgement that comprises an extended acknowledgement frame, a bidirectional acknowledgement (BACK) frame that includes data, or an extended BACK frame that includes data.

Figure 4:
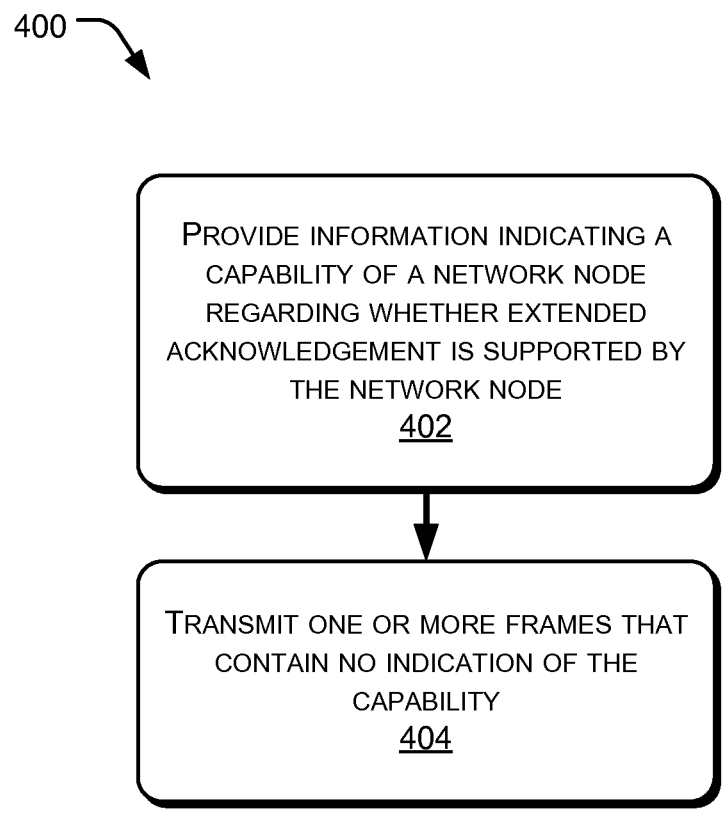
FIG. 4 is a flowchart of still another aspect of extended acknowledgement in accordance with an embodiment of the present disclosure.

FIG. 4 illustrates a process 400 of yet another aspect of extended acknowledgement in accordance with an embodiment of the present disclosure.

Example process 400 includes one or more operations, actions, or functions as illustrated by one or more of blocks 402 and 404. Although illustrated as discrete blocks, various blocks may be divided into additional blocks, combined into fewer blocks, or eliminated, depending on the desired implementation. Further, process 400 may be implemented by software, hardware, or a combination of software and hardware in a communication device. For illustrative purposes, the operations described below are performed by a processor or integrated circuit of a communication device. Processing may begin at block 402.

At 402, a first network node may provide, during registration of the first network node with a domain master of a network domain, information indicating a capability of the first network node regarding whether extended acknowledgement is supported by the first network node.

At 404, the first network domain may transmit one or more frames to one or more network nodes associated with the network domain, where each of the one or more frames contains no indication of the capability of the first network node regarding whether the extended acknowledgement is supported by the first network node.

In at least some embodiments, the information may be propagated to the one or more network nodes via media access plan (MAP) or routing update.

In at least some embodiments, the extended acknowledgement may be supported by at least one of the one or more network nodes.

In at least some embodiments, the extended acknowledgement may be supported by at least a second network node of the one or more network nodes and not supported by at least a third network node of the one or more network nodes.

In at least some embodiments, the second network node and the third network node may be assigned to a predefined transmit opportunity (TXOP).

In at least some embodiments, the method may further comprise receiving, from at least one of the one or more network nodes, an acknowledgement that comprises a regular acknowledgement frame, an acknowledgement that comprises an extended acknowledgement frame, a bidirectional acknowledgement (BACK) frame that includes data, or an extended BACK frame that includes data.

Additional and Alternative Implementation Notes

The above-described techniques pertain to an extended acknowledgement mechanism. Although the techniques have been described in language specific to structural features and/or methodological acts, it is to be understood that the appended claims are not necessarily limited to the specific features or acts described. Rather, the specific features and acts are disclosed as example forms of implementing such techniques. Those skilled in the art may make derivations and/or modifications of any of the disclosed embodiments or any variations thereof, and such derivations and modifications are still within the scope of the present disclosure.

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventor intends the described embodiments to be primarily examples. The inventor does not intend these embodiments to limit the scope of the appended claims. Rather, the inventor has contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in the present disclosure, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A method, comprising:
   providing, by a source node, an indication that an extended acknowledgement, which contains a higher number of information bits than a regular acknowledgement and in which all of the information bits need to be decoded, is supported by the source node; and
   receiving, from a destination node that supports an extended acknowledgement, two or more of below-listed frames, chosen based on a respective requirement and at least one of which being an acknowledgement that comprises an extended acknowledgement frame and another being a bidirectional acknowledgement (BACK) frame:
   an acknowledgement that comprises a regular acknowledgement frame,
   an acknowledgement that comprises an extended acknowledgement frame,
   a BACK frame that includes data, and
   an extended BACK frame that includes data.

2. The method of claim 1, wherein the providing comprises transmitting the indication in a frame.

3. The method of claim 1, wherein the providing comprises communicating with a domain master to provide the indication during registration with the domain master such that the indication is propagated domain-wide via media access plan (MAP) or routing update.

4. The method of claim 1, wherein the extended acknowledgement frame comprises an extended PHY frame header.

5. The method of claim 2, wherein the frame is a bidirectional message (BMSG) frame.

6. The method of claim 2, wherein the frame transmitted by the source node includes a request for immediate acknowledgement, and wherein the acknowledgement received from the destination node comprises a frame having an extended acknowledgement request (EXTACKRQ) field set to 1.

7. The method of claim 2, wherein a bidirectional frame sequence between the source node and the destination node including at least the frame and the acknowledgement occurs within boundaries of a predefined transmit opportunity (TXOP) or time slot (TS) for the source node.

8. The method of claim 7, wherein the bidirectional frame sequence between the source node and the destination node occurs during a contention-free transmit opportunity (CFTXOP), a shared transmit opportunity (STXOP), or a contention-based transmit opportunity (CBTXOP).

9. The method of claim 1, wherein the acknowledgement is an immediate acknowledgement.

10. The method of claim 2, wherein the frame includes an indication by the source node that the destination node is allowed to send an extended acknowledgement.

11. The method of claim 10, wherein the indication that the destination node is allowed to send an extended acknowledgement includes a bidirectional transmission grant length (BTXGL) field set to a non-zero value, a bidirectional transmission end flag (BTXEF) field set to 1, and an extended acknowledgement granted (EXTACKGR) field set to 1.

12. The method of claim 2, wherein a PHY frame header of the frame includes an indication to the destination node that the source node supports the extended acknowledgement.

13. The method of claim 12, wherein the indication to the destination node that the source node supports the extended acknowledgement includes an extended acknowledgement supported (EXTACKSUP) field set to 1.

14. The method of claim 2, wherein the transmitted frame indicates a maximum duration of the received acknowledgment which is an ACK frame, an extended ACK frame, a BACK frame, or an extended BACK frame.

15. The method of claim 1, wherein the regular acknowledgement frame, the extended acknowledgement frame, the BACK frame, or the extended BACK frame is received from the destination node before another frame is received from the destination node.

16. The method of claim 1, further comprising:
   terminating the extended acknowledgement; and
   re-starting extended acknowledgement sometime after the terminating.

17. The method of claim 1, further comprising:
   receiving, from the destination node, a BACK frame indicating the extended acknowledgement is advised to be terminated; and
   terminating the extended acknowledgement.

18. The method of claim 17, wherein the BACK frame indicating the extended acknowledgement is advised to be terminated includes a bidirectional transmission request length (BTXRL) field set to 0 and an extended acknowledgement request (EXTACKRQ) field set to 0.

19. The method of claim 1, further comprising:
   terminating a bidirectional transmission by transmitting a BMSG frame with a bidirectional transmission end flag (BTXEF) field set to 1 and a bidirectional transmission grant length (BTXGL) field set to a non-zero value such that a total duration of a bidirectional frame sequence between the source node and the destination node includes the non-zero value set in the BTXGL field.

20. A method, comprising:
receiving, from a source node, an indication that an extended acknowledgement, which contains a higher number of information bits than a regular acknowledgement and in which all of the information bits need to be decoded, is supported; and
transmitting, by a destination node that supports an extended acknowledgement, in response to the receiving, two or more of below-listed frames, chosen based on a respective requirement and at least one of which being an acknowledgement that comprises an extended acknowledgement frame and another being a bidirectional acknowledgement (BACK) frame:
an acknowledgement that comprises a regular acknowledgement frame,
an extended acknowledgement frame,
a BACK frame that includes data, and
an extended BACK frame that includes data.

21. The method of claim 20, wherein the receiving comprises receiving the indication in a frame from the source node.

22. The method of claim 20, wherein the receiving comprises receiving the indication via media access plan (MAP) or routing update from a domain master, after registration of the source node with a domain master with the indication provided by the source node to the domain master during registration, such that the indication is propagated domain-wide via MAP or routing update.

23. The method of claim 20, wherein the extended acknowledgement frame comprises an extended PHY frame header.

24. The method of claim 21, wherein the frame is a bidirectional message (BMSG) frame.

25. The method of claim 21, wherein the frame received from the source node requests for immediate acknowledgement, and wherein the acknowledgement transmitted by the destination node comprises a frame having an extended acknowledgement request (EXTACKRQ) field set to 1.

26. The method of claim 21, wherein a bidirectional frame sequence between the source node and the destination node including at least the frame received from the source node and the acknowledgement transmitted by the destination node occurs within boundaries of a predefined transmit opportunity (TXOP) or time slot (TS) for the source node.

27. The method of claim 26, wherein the bidirectional frame sequence between the source node and the destination node occurs during a contention-free transmit opportunity (CFTXOP), a shared transmit opportunity (STXOP), or a contention-based transmit opportunity (CBTXOP).

28. The method of claim 20, wherein the acknowledgement is an immediate acknowledgement.

29. The method of claim 21, wherein the frame includes an indication by the source node that the destination node is allowed to send an extended acknowledgement.

30. The method of claim 29, wherein the indication that the destination node is allowed to send an extended acknowledgement includes a bidirectional transmission grant length (BTXGL) field set to a non-zero value, a bidirectional transmission end flag (BTXEF) field set to 1, and an extended acknowledgement granted (EXTACKGR) field set to 1.

31. The method of claim 21, wherein the frame includes an indication to the destination node that the source node supports the extended acknowledgement.

32. The method of claim 31, wherein the indication to the destination node that the source node supports the extended acknowledgement includes an extended acknowledgement supported (EXTACKSUP) field set to 1.

33. The method of claim 21, wherein the received frame indicates a maximum duration of the transmitted acknowledgement which is an ACK frame, an extended ACK frame, a BACK frame, or an extended BACK frame.

34. The method of claim 20, wherein the regular acknowledgement frame, the extended acknowledgement frame, the BACK frame or the extended BACK frame is transmitted by the destination node before another frame is transmitted by the destination node.

35. The method of claim 20, further comprising:
transmitting, from the destination node to the source node, a BACK frame indicating the extended acknowledgement is advised to be terminated.

36. The method of claim 35, wherein the BACK frame indicating the extended acknowledgement is advised to be terminated includes a bidirectional transmission request length (BTXRL) field set to 0 and an extended acknowledgement request (EXTACKRQ) field set to 0.

37. The method of claim 20, further comprising:
transmitting, from the destination node to the source node, a BACK frame indicating a desired duration for a subsequent BACK frame.

38. The method of claim 37, wherein the BACK frame indicating the desired duration for a subsequent BACK frame includes a bidirectional transmission request length (BTXRL) field in a PHY frame header that includes the desired duration.

39. A method, comprising:
receiving, from a first network node, that supports bidirectional framing, during registration of the first network node with a domain master of a network domain, information indicating a capability of the first network node regarding whether an extended acknowledgement, which contains a higher number of information bits than a regular acknowledgement and in which all of the information bits need to be decoded, is supported by the first network node; and
propagating the information to one or more network nodes associated with the network domain.

40. The method of claim 39, wherein the propagating comprises propagating via media access plan (MAP) or routing update.

41. The method of claim 39, wherein the extended acknowledgement is supported by at least one of the one or more network nodes.

42. The method of claim 39, wherein the extended acknowledgement is supported by at least a second network node of the one or more network nodes and not supported by at least a third network node of the one or more network nodes.

43. The method of claim 42, wherein the second network node and the third network node are assigned to a predefined transmit opportunity (TXOP).

44. The method of claim 39, further comprising:
receiving one or more frames from the first network node, each of the one or more frames containing no indication of the capability of the first network node regarding whether the extended acknowledgement is supported by the first network node.

45. The method of claim 44, further comprising:
in response to the first network node supporting the extended acknowledgement and receiving the one or more frames from the first network node, transmitting an acknowledgement that comprises a regular acknowledgement frame, an acknowledgement that comprises an extended acknowledgement frame, a bidirectional acknowledgement (BACK) frame that includes data, or an extended BACK frame that includes data.

46. A method, comprising:
providing, by a first network node, that supports bidirectional framing, during registration of the first network node with a domain master of a network domain, information indicating a capability of the first network node regarding whether an extended acknowledgement, which contains a higher number of information bits than a regular acknowledgement and in which all of the information bits need to be decoded, is supported by the first network node; and
transmitting, by the first network node, one or more frames to one or more network nodes associated with the network domain, each of the one or more frames containing no indication of the capability of the first network node regarding whether the extended acknowledgement is supported by the first network node.

47. The method of claim 46, wherein the information is propagated to the one or more network nodes via media access plan (MAP) or routing update.

48. The method of claim 46, wherein the extended acknowledgement is supported by at least one of the one or more network nodes.

49. The method of claim 46, wherein the extended acknowledgement is supported by at least a second network node of the one or more network nodes and not supported by at least a third network node of the one or more network nodes.

50. The method of claim 49, wherein the second network node and the third network node are assigned to a predefined transmit opportunity (TXOP).

51. The method of claim 46, further comprising:
receiving, from at least one of the one or more network nodes, an acknowledgement that comprises a regular acknowledgement frame, an acknowledgement that comprises an extended acknowledgement frame, a bidirectional acknowledgement (BACK) frame that includes data, or an extended BACK frame that includes data.

52. The method of claim 1, further comprising:
receiving, from the destination node, a regular acknowledgement frame or an extended acknowledgement frame indicating the extended acknowledgement is advised to be terminated; and
terminating the extended acknowledgement.

53. The method of claim 52, wherein the regular acknowledgement frame or the extended acknowledgement frame indicating the extended acknowledgement is advised to be terminated includes an extended acknowledgement request (EXTACKRQ) field set to 0.

54. The method of claim 20, further comprising:
transmitting, from the destination node to the source node, a regular acknowledgement frame or an extended acknowledgement frame indicating the extended acknowledgement is advised to be terminated.

55. The method of claim 54, wherein the regular acknowledgement frame or the extended acknowledgement frame indicating the extended acknowledgement is advised to be terminated includes an extended acknowledgement request (EXTACKRQ) field set to 0.

* * * * *